(12) United States Patent
Takata (10) Patent No.: US 11,021,959 B2
(45) Date of Patent: Jun. 1, 2021

(54) RADIAL INFLOW TURBINE, TURBOCHARGER, AND METHOD FOR ASSEMBLING TURBOCHARGER

(71) Applicant: MITSUBISHI HEAVY INDUSTRIES, LTD., Tokyo (JP)

(72) Inventor: Ryo Takata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 101 days.

(21) Appl. No.: 16/308,982

(22) PCT Filed: Sep. 21, 2017

(86) PCT No.: PCT/JP2017/033999
§ 371 (c)(1),
(2) Date: Dec. 11, 2018

(87) PCT Pub. No.: WO2018/131213
PCT Pub. Date: Jul. 19, 2018

(65) Prior Publication Data
US 2019/0284937 A1 Sep. 19, 2019

(30) Foreign Application Priority Data
Jan. 16, 2017 (JP) ............................ JP2017-005069

(51) Int. Cl.
*F01D 5/04* (2006.01)
*F01D 25/00* (2006.01)
(Continued)

(52) U.S. Cl.
CPC ............... *F01D 5/04* (2013.01); *F01D 5/048* (2013.01); *F01D 25/00* (2013.01); *F02B 37/18* (2013.01);
(Continued)

(58) Field of Classification Search
CPC ... F01D 5/00; F01D 5/04; F01D 5/043; F01D 5/048; F01D 5/10; F01D 17/105;
(Continued)

(56) References Cited

U.S. PATENT DOCUMENTS 2,487,514 A * 11/1949 Boestad et al. ......... F01D 5/085
415/115
3,931,712 A * 1/1976 Keller ................... F02B 37/186
60/602
(Continued)

FOREIGN PATENT DOCUMENTS

CN 104487673 A 4/2015
JP 60-13926 A 1/1985
(Continued)

OTHER PUBLICATIONS

Extended European Search Report dated Sep. 23, 2019 issued in the corresponding European Application No. 17890970.1.
(Continued)

*Primary Examiner* — Brian P Wolcott
(74) *Attorney, Agent, or Firm* — Birch, Stewart, Kolasch & Birch, LLP.

(57) ABSTRACT

A radial inflow turbine includes a turbine wheel having a blade, in which a hub-side end of a leading edge of the blade is located radially inward relative to a shroud-side end of the leading edge, and a housing having a scroll part and a bend part deflecting a flow of a working fluid flowing radially inward from the scroll part, along an axial direction. The turbine wheel has at least one through hole bypassing the blade.

10 Claims, 11 Drawing Sheets

(51) Int. Cl.
*F02B 37/18* (2006.01)
*F02C 6/12* (2006.01)
*F15D 1/00* (2006.01)
*F01D 17/10* (2006.01)

(52) U.S. Cl.
CPC .............. *F02C 6/12* (2013.01); *F01D 17/105* (2013.01); *F05D 2220/40* (2013.01); *F05D 2230/68* (2013.01); *F05D 2240/24* (2013.01); *F05D 2240/305* (2013.01); *F05D 2260/606* (2013.01); *F15D 1/0055* (2013.01); *Y02T 10/12* (2013.01)

(58) Field of Classification Search
CPC ......... F05D 2260/606; F05D 2240/305; F05D 2240/24; F05D 2220/40; F05D 2210/43; F02C 6/12; Y02T 10/144
See application file for complete search history.

(56) References Cited

U.S. PATENT DOCUMENTS

| | | | | |
|---|---|---|---|---|
| 4,170,435 A | * | 10/1979 | Swearingen | F04D 29/0416 415/1 |
| 4,648,790 A | | 3/1987 | Hörler | |
| 6,860,715 B2 | * | 3/2005 | Sekularac | F04D 29/30 415/115 |
| 7,549,282 B2 | * | 6/2009 | Widenhoefer | F01D 5/145 415/117 |
| 9,677,463 B2 | * | 6/2017 | Takata | F01D 11/04 |
| 2012/0027569 A1 | | 2/2012 | Purdey | |
| 2014/0234091 A1 | | 8/2014 | Yokoyama et al. | |
| 2015/0167543 A1 | | 6/2015 | Takata | |
| 2016/0160672 A1 | | 6/2016 | Takata et al. | |
| 2018/0094530 A1 | * | 4/2018 | Smith | F02B 33/40 |
| 2019/0162113 A1 | * | 5/2019 | Rao | F01D 17/105 |

FOREIGN PATENT DOCUMENTS

| | | | | | |
|---|---|---|---|---|---|
| JP | 9-144550 A | | 6/1997 | | |
| JP | 2005-240727 A | | 9/2005 | | |
| JP | 2007-205221 A | | 8/2007 | | |
| JP | 2009-57850 A | | 3/2009 | | |
| JP | 2009057850 A | * | 3/2009 | ............. | F02B 39/00 |
| JP | 2012-26455 A | | 2/2012 | | |
| JP | 2012026455 A | * | 2/2012 | ............. | F01D 5/04 |
| JP | 2013-133819 A | | 7/2013 | | |
| JP | 2013-194674 A | | 9/2013 | | |
| WO | WO 2014/033920 A1 | | 3/2014 | | |
| WO | WO 2014/203372 A1 | | 12/2014 | | |
| WO | WO 2016/194593 A1 | | 12/2016 | | |

OTHER PUBLICATIONS

Office Action dated Oct. 8, 2019 issued to the corresponding Japanese Patent Application No. 2017-005069 with a Machine Translation.
International Search Report (PCT/ISA/210) issued in PCT/JP2017/033999, dated Dec. 12, 2017.
Office Action dated Jun. 9, 2020 issued in counterpart Chinese Application No. 201780039521.X.

* cited by examiner

RADIAL INFLOW TURBINE, TURBOCHARGER, AND METHOD FOR ASSEMBLING TURBOCHARGER

TECHNICAL FIELD

The present invention relates to a radial inflow turbine, a turbocharger, and a method for assembling the turbocharger.

BACKGROUND ART

Conventionally, turbochargers for automobiles or the like recover exhaust energy emitted from various engines, and the energy recovered from a working fluid at middle-low temperature or high temperature with low pressure or high pressure discharged from the engines is converted to rotational power and used for supercharging. Various turbines are disclosed as the turbine used for recovering power of the exhaust energy. For instance, Patent Document 1 discloses an axial-flow turbine of a radial inflow type having no stationary vanes.

CITATION LIST

Patent Literature

Patent Document 1: JPH9-144550A

SUMMARY

Problems to be Solved

Patent Document 1 describes nothing about the shape of a rotor blade disc considering a bend flow and a scroll. However, for instance, in case of an axial-flow turbine or a mixed flow turbine of a radial inflow type combining a scroll with rotor blades and using, no stationary vanes such as turbochargers for automobiles, a boundary layer of a working fluid develops at a hub of a bend part, and when the developing boundary layer flows to the blades, the turbine performance significantly decreases.

In view of the above-described problems, an object of at least one embodiment of the present invention is to suppress the reduction in turbine performance due to inflow of a boundary layer to a blade, and it is possible to improve the turbine efficiency.

Solution to the Problems (1) A radial inflow turbine according to at least one embodiment of the present invention comprises: a turbine wheel having a blade, wherein a hub-side end of a leading edge of the blade is located radially inward relative to a shroud-side end of the leading edge; and a housing having a scroll part and a bend part deflecting a flow of a working fluid flowing radially inward from the scroll part, along an axial direction, wherein the turbine wheel has at least one through hole bypassing the blade.

In an axial-flow or mixed flow turbine of a radial inflow type (a turbine in which a hub-side end of a leading edge of the blade is located radially inward relative to a shroud-side end of the leading edge of the blade), when the working fluid flows through the bend part from the scroll part toward the blade, a boundary layer develops in the vicinity of a hub-side wall surface of an inner wall surface of the housing forming the bend part. When the developing boundary layer flows to the blade, the turbine performance significantly decreases.

In this regard, with the above configuration (1), since at least one through hole bypassing the blade is provided in the turbine wheel, the boundary layer developing in the vicinity of the hub-side wall surface on the upstream side of the blade can be sucked to the downstream side of the blade via the through hole, and thus the thickness of the boundary layer can be reduced. Thereby, it is possible to suppress the reduction in turbine performance due to inflow of the boundary layer to the blade, and it is possible to improve the turbine efficiency.

(2) In some embodiments, in the radial inflow turbine described in the above (1), the working fluid from the scroll part directly flows into the blade without passing through a stationary vane.

In a case where the working fluid directly flows into the blade without passing through a stationary vane as in the above configuration (2), the boundary layer easily develops at a hub-side housing inner wall surface forming the bend part. In this regard, as described in the above (1), if the through hole is provided in the turbine wheel, the boundary layer developing in the vicinity of the hub-side wall surface on the upstream side of the blade can be sucked to the downstream side of the blade to suppress inflow of the boundary layer to the blade. Consequently, it is possible to effectively improve the turbine efficiency in the radial inflow turbine in which the working fluid directly flows into the blade without passing through a stationary vane.

(3) In some embodiments, in the radial inflow turbine described in the above (1) or (2), the at least one through hole communicates with a main flow passage of the working fluid in the bend part, via a clearance between an upstream end surface of a disc part of the turbine wheel and an end surface of the housing facing the upstream end surface of the disc part.

In the above configuration (3), the through hole described in the above (1) is provided in the disc part of the turbine wheel. Thus, the boundary layer developing in the vicinity of the hub-side wall surface of the housing inner wall surface forming the bend part can be sucked to the downstream side of the blade via the clearance necessarily existing between the end surface of the housing, which is a stationary part, and the upstream end surface of the disc part of the turbine wheel facing the housing end surface. Thereby, it is possible to suppress the reduction in turbine performance due to inflow of the boundary layer to the blade, and it is possible to improve the turbine efficiency.

(4) In some embodiments, the radial inflow turbine described in the above (3) further comprises a fin part protruding in the axial direction from the upstream end surface of the disc part toward the end surface of the housing.

With the above configuration (4), since the fin part protruding in the axial direction from the upstream end surface of the disc part is provided, it is possible to guide a flow sucked into the clearance along the radial direction between the disc part and the housing, and it is possible to prevent a reverse flow from the clearance to the main flow passage. Thus, it is possible to effectively obtain the above-described technical merit (effect of reducing the thickness of the boundary layer) attributable to the suction of the boundary layer via the through hole, and it is possible to improve the turbine efficiency.

(5) In some embodiments, in the radial inflow turbine described in the above (4), the fin part is an annular fin having an outer peripheral surface extending along an extension line of a hub-side inner wall surface of the housing forming the bend part in an axial cross-section.

With the above configuration (5), it is possible to guide the working fluid of the boundary layer sucked between the end surface of the housing and the upstream end surface of the disc part of the turbine wheel facing the housing end surface, and thus it is possible to improve the turbine efficiency. Further, since the diameter of the through hole can be reduced as a result of the flow guide of the working fluid, it is possible to improve the strength reliability of the turbine wheel and the disc part.

(6) In some embodiments, the radial inflow turbine described in any one of the above (1) to (5) further comprises: a waste-gate channel through which the working fluid flows from an inlet side to an outlet side of the radial inflow turbine so as to bypass the blade; and a waste-gate valve disposed in the waste-gate channel.

With the above configuration (6), by adjusting the opening degree of the waste-gate valve disposed in the waste-gate channel, it is possible to adjust the flow rate of the working fluid passing through the blade. On the other hand, normally, the working fluid bypassing the blade via the waste-gate channel is desirably used for rotation of the blade. Accordingly, if the working fluid bypasses the blade and flows to the outlet side of the turbine, it leads to the reduction in turbine efficiency.

In this regard, in the above configuration (6), as described in the above (1), since the boundary layer developing in the vicinity of the hub-side wall surface on the upstream side of the blade can be sucked to the downstream side of the blade via the through hole, it is possible to reduce the thickness of the boundary layer and improve the turbine efficiency. That is, as a result of intensive studies, the present inventors found that when at least a part of the working fluid flowing to the outlet of the radial inflow turbine via the waste-gate channel, which does not contribute to the improvement in turbine efficiency, is caused to bypass the blade via the through hole provided in the turbine wheel, it is possible to suppress the reduction in turbine performance due to inflow of the boundary layer to the blade, and it is possible to improve the turbine efficiency.

(7) In some embodiments, in the radial inflow turbine described in any one of the above (1) to (6), a ratio of a suction flow rate of the working fluid sucked via the at least one through hole to a flow rate of the working fluid flowing into the bend part is 0.005 or more and 0.04 or less.

As described in the above (1), when the working fluid is sucked via the through hole, the thickness of the boundary layer is reduced, and the turbine efficiency is improved. On the other hand, the working fluid sucked via the through hole bypasses the blade, which reduces work on the blade. Hence, there is a range of the suction flow rate of the working fluid which enables high turbine efficiency.

In this respect, the present inventors have intensively studied and consequently found that when a ratio of a suction flow rate of the working fluid sucked via the through hole to a main flow rate (flow rate of the working fluid flowing into the bend part) is set within the range described in the above (7), it is possible to effectively improve the turbine efficiency.

In case of a turbine including a waste-gate valve, the ratio is desirably set around 1% (e.g., 0.005 or more and 0.015 or less) because, even when the waste-gate valve is closed, it is possible to suppress the reduction in output power due to the reduction in flow rate of the working fluid passing through the blade.

(8) In some embodiments, in the radial inflow turbine described in any one of the above (1) to (7), the at least one through hole extends obliquely with respect to the axial direction so as to deviate radially outward from an upstream side to a downstream side.

With the pumping effect accompanying rotation of the turbine wheel, the working fluid is transferred from a radially inner opening to a radially outer opening of the through hole provided in the turbine wheel. Accordingly, with the above configuration (8), a force acts on the working fluid passing through the through hole provided in the turbine wheel to transfer the working fluid from the upstream side to the downstream side. Thus, the boundary layer of the working fluid formed on the hub-side housing inner wall surface forming the bend part is introduced to the downstream side more smoothly via the through hole, and the turbine efficiency is improved. Furthermore, since the pumping effect ensures the flow rate of the working fluid passing through the through hole even with the through hole having a small diameter, it is possible to improve the strength reliability of the turbine wheel.

(9) In some embodiments, in the radial inflow turbine described in any one of the above (1) to (8), the housing includes at least one housing inner channel opening to a hub-side inner wall surface of the housing forming the bend part, and the at least one housing inner channel communicates with the at least one through hole.

With the above configuration (9), since the housing inner channel communicating with the through hole is provided so as to open to the hub-side inner wall surface of the housing, it is possible to suck out and guide the boundary layer at the beginning of development in the bend part to the through hole. Thereby, the turbine efficiency is improved.

(10) A turbocharger according to at least one embodiment of the present invention comprises: the radial inflow turbine according to any one of the above (1) to (9); and a compressor for driving the radial inflow turbine.

With the above configuration (10), at least one through hole bypassing the blade is provided in the turbine wheel, and the boundary layer developing in the vicinity of the hub-side wall surface on the upstream side of the blade is sucked to the downstream side of the blade via the through hole to reduce the thickness of the boundary layer. Thereby, it is possible to suppress the reduction in turbine performance due to inflow of the boundary layer to the blade and achieve the turbocharger with improved turbine efficiency.

(11) A method for assembling a turbocharger according to at least one embodiment of the present invention is a method for assembling a turbocharger including a turbine wheel having a blade and a compressor wheel connected to a rotational shaft of the turbine wheel, a hub-side end of a leading edge of the blade being located radially inward relative to a shroud-side end of the leading edge, the method comprising: a step of respectively engaging a plurality of locking parts of a fixation jig with a plurality of through holes provided in a disc part of the turbine wheel; a step of assembling the compressor wheel to the rotational shaft; and a step of screwing a first screw part of a fastening member with a second screw part formed at an end portion of the rotational shaft, in a state where the plurality of locking parts of the fixation jig are respectively engaged with the plurality of through holes of the disc part, to fasten the compressor wheel, which is assembled to the rotational shaft, to the rotational shaft.

With the above method (11), the locking parts of the fixation jig are inserted into the through holes provided in the turbine wheel, whereby the shaft of the turbine wheel is easily screwed with the compressor wheel. Thus, it is possible to improve the assemblability of the turbocharger.

In particular, in case of a compact turbocharger having a small turbine wheel, its assembling workability affects durability and reliability. The above assembling method (11) is advantageous for assembling such a compact turbocharger.

Advantageous Effects

According to at least one embodiment of the present invention, in an axial flow or mixed flow turbine of a radial inflow type, it is possible to suppress the reduction in turbine performance due to inflow of a boundary layer to a blade, and it is possible to improve the turbine efficiency.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
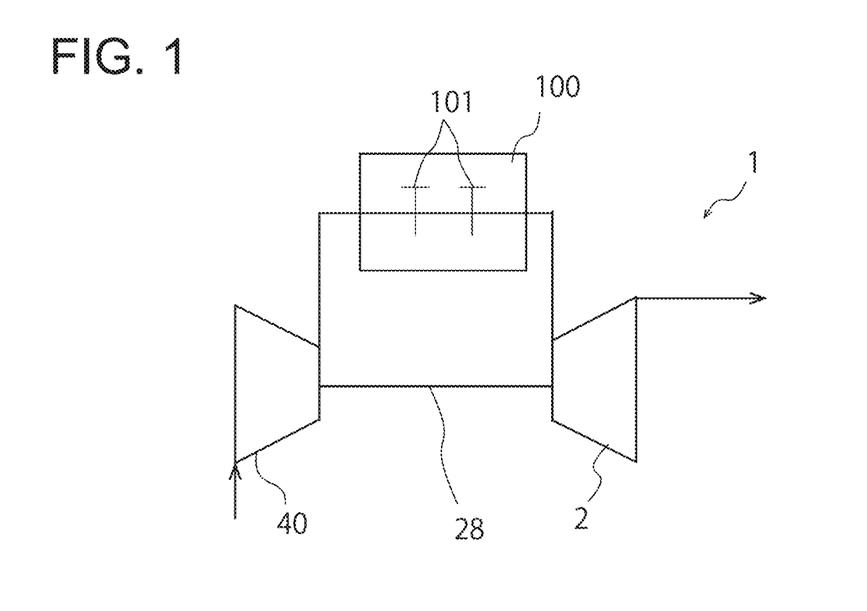
FIG. 1 is a schematic diagram showing a configuration of a turbocharger according to an embodiment.
Figure 2:
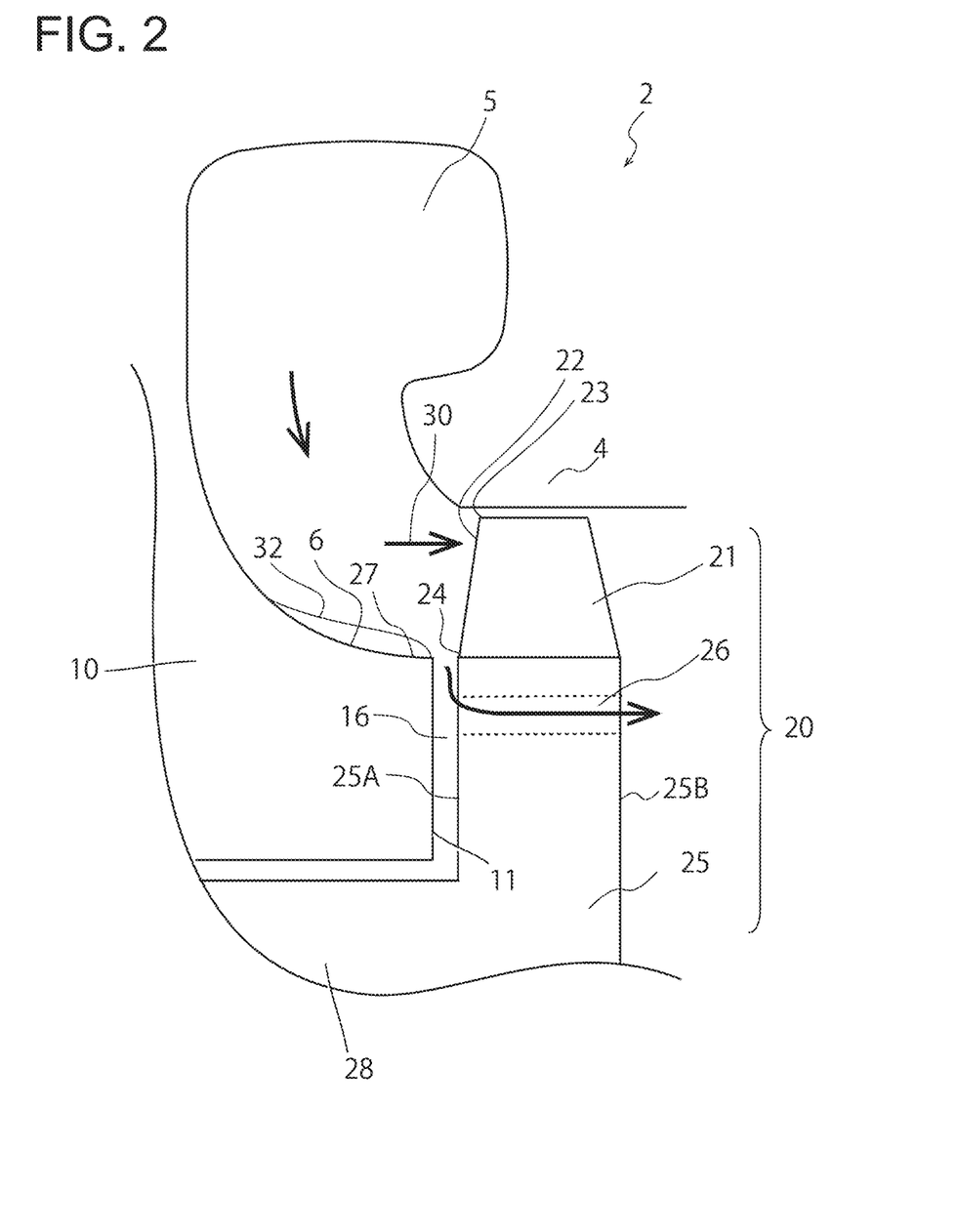
FIG. 2 is a schematic diagram of a radial inflow turbine according to an embodiment.
Figure 3:
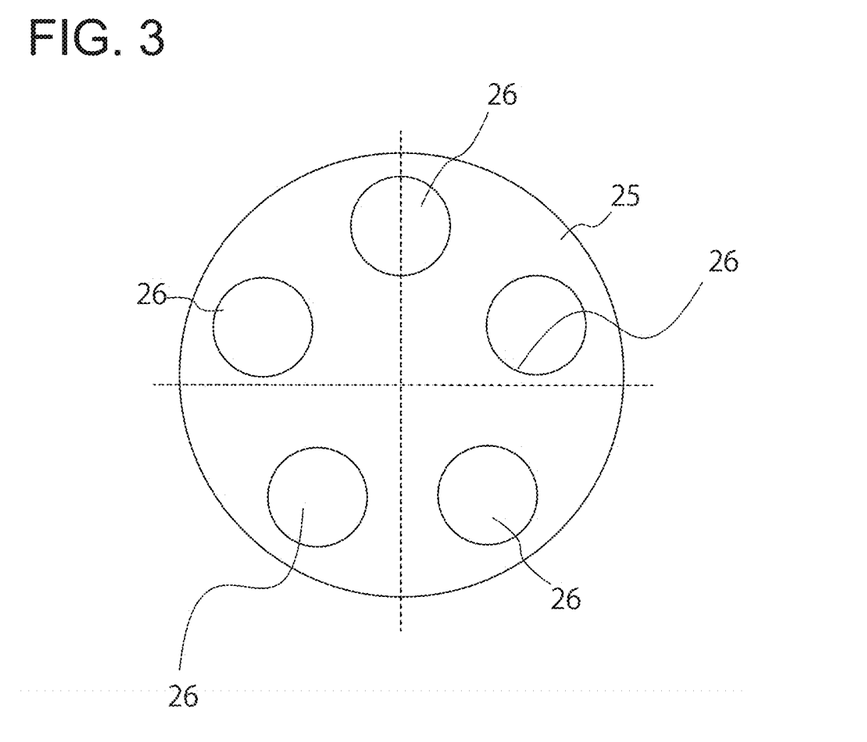
FIG. 3 is a diagram of a disc part of a turbine wheel according to an embodiment, viewed from an axial direction.

FIG. 1 is a schematic diagram showing a configuration of a turbocharger according to an embodiment. FIG. 2 is a schematic diagram of a radial inflow turbine according to an embodiment. FIG. 3 is a diagram of a disc part of a turbine wheel according to an embodiment, viewed from an axial direction.

As shown in FIGS. 1 and 2, a turbocharger 1 according to some embodiments includes a radial inflow turbine 2 and a compressor 40 for driving the radial inflow turbine 2.

The radial inflow turbine 2 is disposed on the exhaust side of an engine 100 including a piston 101 and a cylinder (not shown) and is rotationally driven by using exhaust energy from the engine 100. The compressor 40 is disposed on the intake side of the engine 100 and is connected to the radial inflow turbine 2 via a turbine shaft 28 (rotational shaft) in a coaxially rotatable manner. When the radial inflow turbine 2 is rotated by exhaust gas of the engine 100 as a working fluid, this torque rotates the compressor 40 and causes air intake (supercharging) into the engine 100.

As shown in FIG. 2, the radial inflow turbine 2 (turbine) according to an embodiment includes a turbine wheel 20 rotatable around the turbine shaft 28 and a housing 10 accommodating the turbine wheel 20.

The turbine wheel 20 includes a disc part 25 of substantially cylindrical shape and a plurality of blades 21 radially formed around the outer periphery of the disc part 25. In the blade 21, a hub-side end 24 of a leading edge 22 is located radially inward relative to a shroud-side end 23 of the leading edge 22.

The housing 10 includes a scroll part 5 and a bend part 6 deflecting a flow of the working fluid, which flows inward in a radial direction of the turbine wheel 20 from the scroll part 5, along an axial direction of the turbine wheel 20.

In some embodiments, the turbine wheel 20 has at least one through hole 26 bypassing the blade 21. For instance, FIG. 3 shows an example in which five through holes 26 are provided at equal intervals in a circumferential direction of the turbine wheel 20. In other embodiments, the number is not limited to five, and any number of through holes 26 may be provided. In the embodiments illustrated in FIGS. 2 and 3, the through holes 26 are provided to penetrate the turbine wheel 20 along an axial direction of the turbine shaft 28.

In an axial-flow turbine or mixed flow turbine of a radial inflow type (i.e., a turbine in which the hub-side end of the leading edge 22 of the blade 21 is located radially inward relative to the shroud-side end of the leading edge 22 of the blade 21), when the working fluid flows through the bend part 6 from the scroll part 5 toward the blade 21, a boundary layer 32 develops in the vicinity of a hub-side wall surface of an inner wall surface of the housing 10 forming the bend part 6. When the developing boundary layer 32 flows to the blade 21, the turbine performance significantly decreases.

In this regard, in some embodiments, at least one through hole 26 bypassing the blade 21 is provided in the turbine wheel 20. This enables the boundary layer 32 developing in the vicinity of the hub-side wall surface 27 on the upstream side of the blade 21 to be sucked to the downstream side of the blade 21 via the through hole 26, thus reducing the thickness of the boundary layer 32. Thereby, it is possible to suppress the reduction in turbine performance due to inflow of the boundary layer 32 to the blade 21, and it is possible to improve the turbine efficiency.

In some embodiments, the radial inflow turbine 2 is configured so that the working fluid directly flows into the blade 21 from the scroll part 5 without passing through a stationary vane (not shown). In a case where the working fluid directly flows into the blade 21 from the scroll part 5 without passing through a stationary vane, the boundary layer 32 easily develops at a hub-side inner wall surface of the housing 10 forming the bend part 6. In this regard, as described above, if the through hole 26 is provided in the turbine wheel 20, the boundary layer 32 developing in the vicinity of the hub-side wall surface 27 on the upstream side of the blade 21 can be sucked to the downstream side of the blade 21, and inflow of the boundary layer 32 to the blade 21 can be suppressed. Consequently, it is possible to effectively improve the turbine efficiency in the radial inflow turbine 2 in which the working fluid directly flows into the blade 21 without passing through a stationary vane.

In some embodiment, the radial inflow turbine 2 may be configured so that at least one through hole 26 communicates with a main flow passage 30 of the working fluid in the bend part 6 via a clearance 16 between an upstream end surface 25A of the disc part 25 of the turbine wheel 20 and a housing end surface 11 facing the upstream end surface 25A of the disc part 25.

Thus, via the clearance 16 necessarily existing between the end surface (housing end surface 11) of the housing 10, which is a stationary part, and the upstream end surface 25A of the disc part 25 of the turbine wheel 20 facing the housing end surface 11, the boundary layer 32 developing in the vicinity of the hub-side wall surface 27 of the housing inner wall surface forming the bend part 6 can be sucked to the downstream side of the blade 21. Thereby, it is possible to suppress the reduction in turbine performance due to inflow of the boundary layer 32 to the blade 21, and it is possible to improve the turbine efficiency.

Figure 4A:
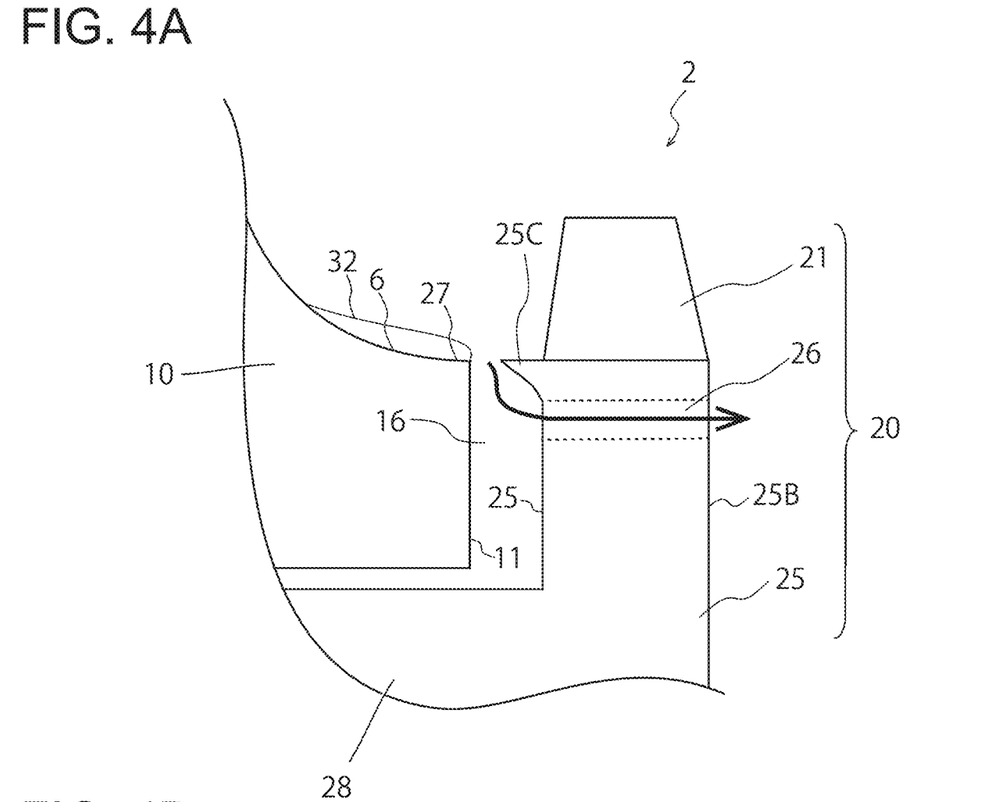
FIG. 4A is a schematic diagram of a fin according to an embodiment.
Figure 4B:
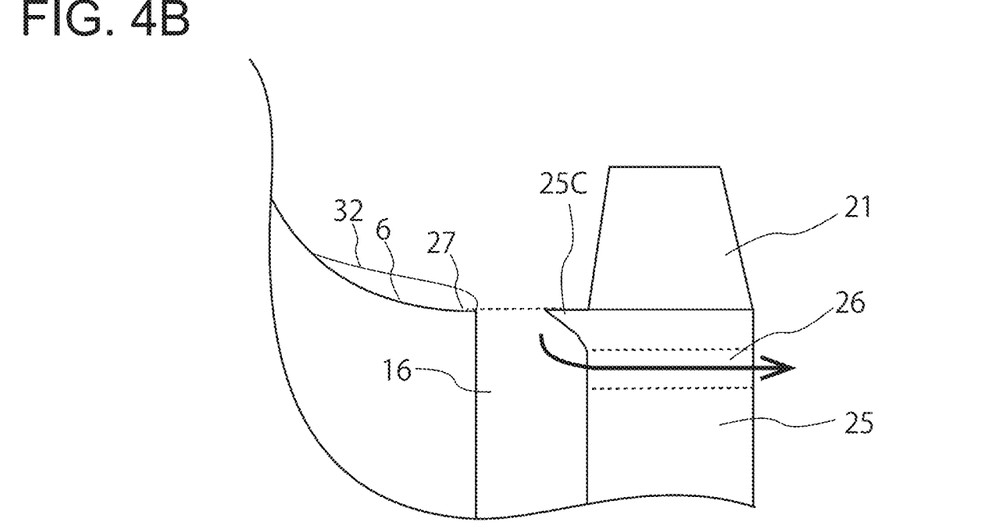
FIG. 4B is a schematic diagram of a fin according to an embodiment.

FIGS. 4A and 4B are each a schematic diagram of a fin according to an embodiment. As shown in FIG. 4A, in some embodiments, the radial inflow turbine 2 may further include a fin part 25C protruding from the upstream end surface 25A of the disc part 25 toward the end surface (housing end surface 11) of the housing 10 in the axial direction. The protrusion amount of the fin part 25C toward the housing end surface 11 increases radially outward.

With this configuration, since the fin part 25C protruding in the axial direction from the upstream end surface 25A of the disc part 25 is provided, it is possible to guide a flow sucked into the clearance 16 along the radial direction between the disc part 25 and the housing 10, and it is possible to prevent a reverse flow from the clearance 16 to the main flow passage 30. Thus, it is possible to effectively obtain the above-described technical merit (effect of reducing the thickness of the boundary layer 32) attributable to the suction of the boundary layer 32 via the through hole 26, and it is possible to improve the turbine efficiency.

As shown in FIG. 4B, in some embodiments, the fin part 25C may be an annular fin 25C having an outer peripheral surface extending along an extension line of the hub-side inner wall surface of the housing 10 forming the bend part 6 in an axial cross-section.

With this configuration, it is possible to guide the working fluid of the boundary layer 32 sucked between the housing end surface 11 and the upstream end surface 25A of the disc part 25 of the turbine wheel 20 facing the housing end surface 11, and thus it is possible to improve the turbine efficiency. Further, guiding the working fluid allows the boundary layer 32 of the working fluid to be introduced to the downstream side of the turbine wheel 20 via the through hole 26 with a small diameter. Accordingly, since the diameter of the through hole 26 can be reduced, it is possible to improve the strength reliability of the turbine wheel 20 and the disc part 25.

Figure 5:
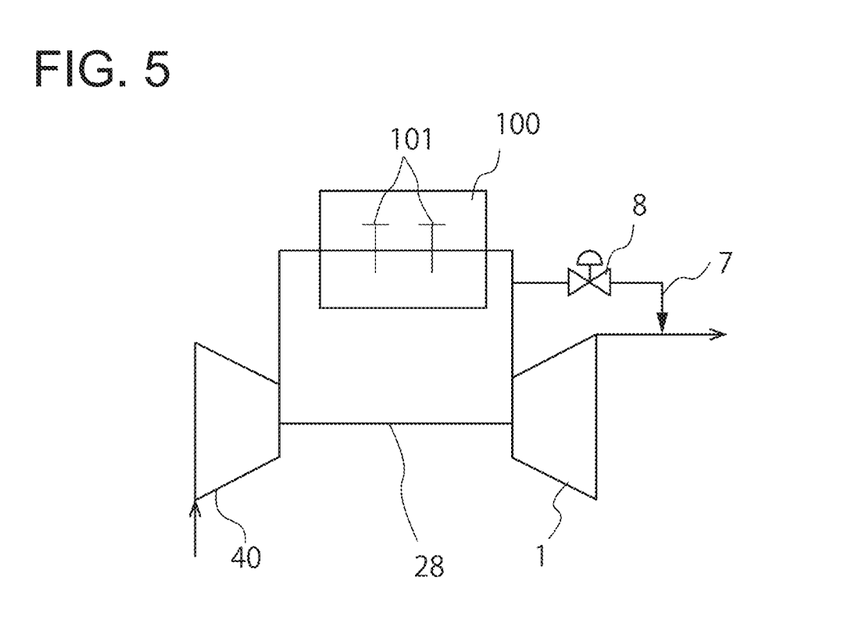
FIG. 5 is a schematic diagram showing a configuration of a turbocharger according to an embodiment.

FIG. 5 is a schematic diagram showing a configuration of a turbocharger 1 according to an embodiment. As shown in FIG. 5, in some embodiments, the radial inflow turbine 2 may include a waste-gate channel 7 through which the working fluid flows from the inlet side to the outlet side of the radial inflow turbine 2 so as to bypass the blade 21. Further, the radial inflow turbine 2 may include a waste-gate valve 8 disposed in the waste-gate channel 7. With this configuration, by adjusting the opening degree of the waste-gate valve 8 disposed in the waste-gate channel 7, it is possible to adjust the flow rate of the working fluid passing through the blade 21. On the other hand, normally, the working fluid bypassing the blade 21 via the waste-gate channel 7 is desirably used for rotation of the blade 21. Accordingly, the flow of the working fluid bypassing the blade 21 to the outlet side of the radial inflow turbine 2 leads to the reduction in turbine efficiency.

In this regard, in the above configuration, the boundary layer 32 developing in the vicinity of the hub-side wall surface 27 on the upstream side of the blade 21 can be sucked to the downstream side of the blade 21 via the through hole 26. Thereby, it is possible to reduce the thickness of the boundary layer 32 and improve the turbine efficiency. That is, as a result of intensive studies, the present inventors found that when at least a part of the working fluid flowing to the outlet of the radial inflow turbine 2 via the waste-gate channel 7, which does not contribute to the improvement in turbine efficiency, is caused to bypass the blade 21 via the through hole 26 provided in the turbine wheel 20, it is possible to suppress the reduction in turbine performance due to inflow of the boundary layer 32 to the blade 21, and it is possible to improve the turbine efficiency.

Figure 6:
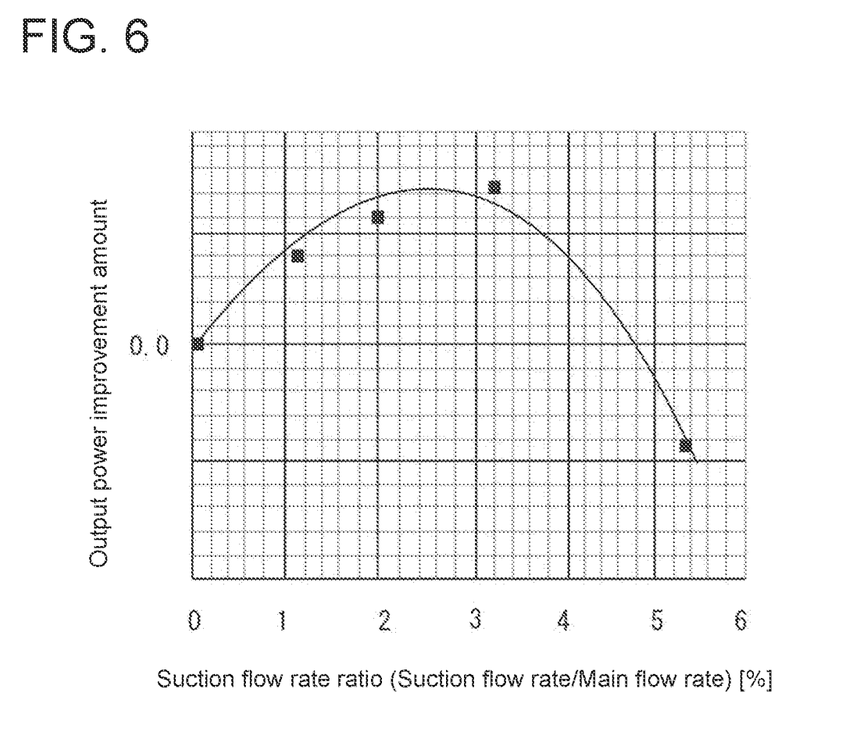
FIG. 6 is a diagram showing a relationship between a ratio of a suction flow rate to a main flow rate of a working fluid and output power improvement amount of a turbine.

FIG. 6 is a diagram showing a relationship between a ratio of a suction flow rate into the through hole 26 to a main flow rate of the working fluid and output power improvement amount of a turbine. As shown in FIG. 6, the output power improvement amount of the turbine has a peak at a ratio of the suction flow rate to the main flow rate of the working fluid of about 0.02 to 0.03 (2 to 3%). In some embodiments, in the radial inflow turbine 2, the ratio of the suction flow rate of the working fluid sucked via at least one through hole 26 to the flow rate of the working fluid flowing into the bend part 6 may be 0.005 or more and 0.04 or less.

As described above, when the working fluid is sucked via the through hole 26, the thickness of the boundary layer 32 is reduced, and the turbine efficiency is improved. On the other hand, the working fluid sucked via the through hole 26 bypasses the blade 21. Accordingly, work on the blade 21 is decreased as much as the working fluid bypasses the blade 21. Hence, there is a range of the suction flow rate of the working fluid which enables high turbine efficiency.

In this respect, when the ratio of the suction flow rate of the working fluid sucked via the through hole 26 to the main flow rate (flow rate of the working fluid flowing into the bend part 6) is set within the above-described range (0.005 or more and 0.04 or less), it is possible to effectively improve the turbine efficiency.

In case of the radial inflow turbine 2 including the waste-gate valve 8, the ratio may be set to be around 1% (for instance, 0.005 or more and 0.015 or less). This range is desirable because, even when the waste-gate valve 8 is closed, it is possible to suppress the reduction in output power due to the reduction in flow rate of the working fluid passing through the blade 21.

Figure 7:
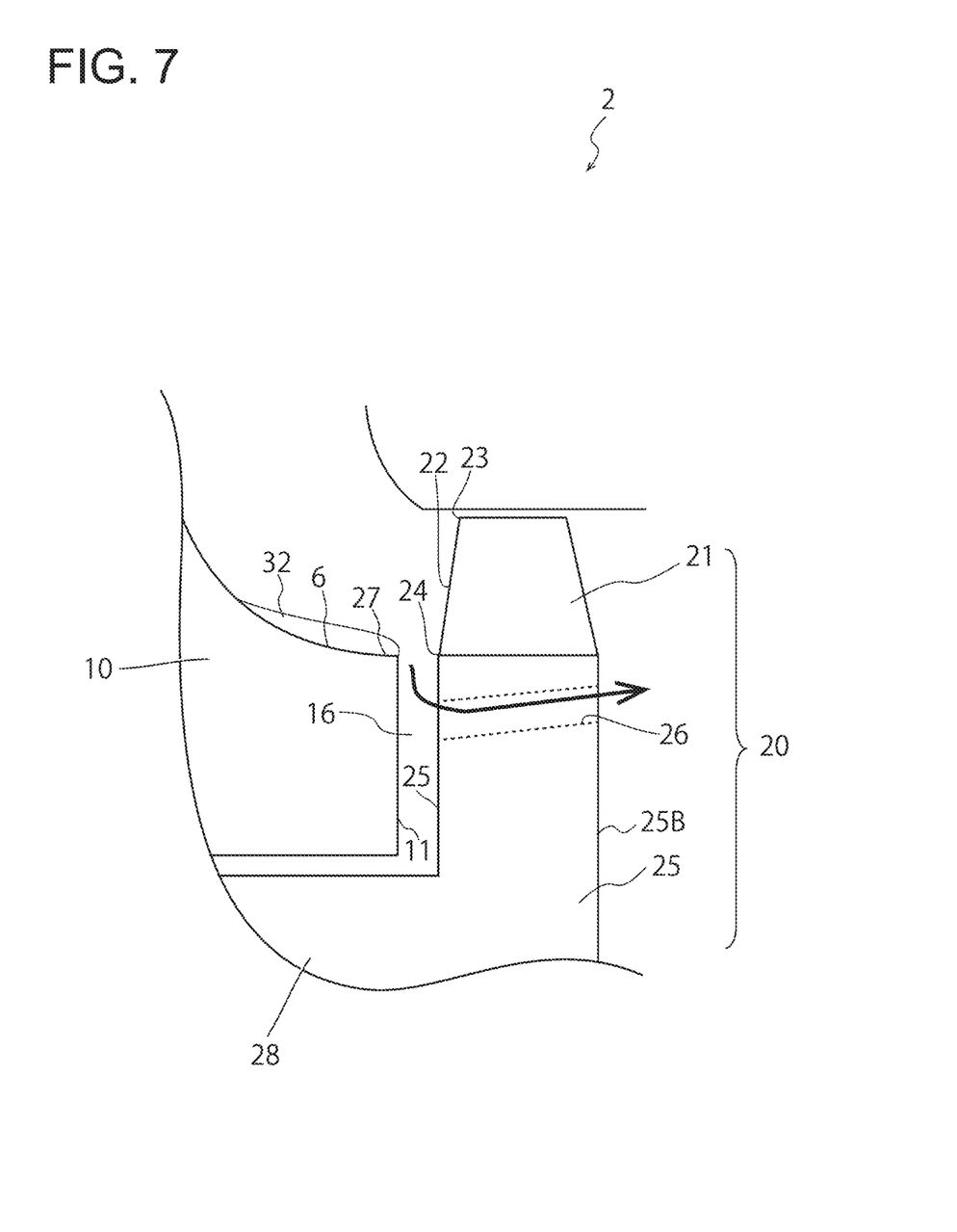
FIG. 7 is a schematic diagram of a through hole according to an embodiment.

FIG. 7 is a schematic diagram of the through hole according to an embodiment. As shown in FIG. 7, in some embodiments, in the above-described radial inflow turbine 2, at least one through hole 26 may extend obliquely with respect to the axial direction so as to deviate radially outward from the upstream side to the downstream side. That is, with the pumping effect accompanying rotation of the turbine wheel 20, the working fluid is transferred from a radially inner opening to a radially outer opening of the through hole 26 provided in the turbine wheel 20. Consequently, with the above configuration, a force acts on the working fluid passing through the through hole 26 provided in the turbine wheel 20 to transfer the working fluid from the upstream side to the downstream side. Thus, the boundary layer 32 of the working fluid formed on the housing inner wall surface on the hub side (hub-side wall surface 27) forming the bend part 6 is introduced to the downstream side more smoothly via the through hole 26, and the turbine efficiency is improved. Furthermore, since the pumping effect ensures the flow rate of the working fluid passing through the through hole 26 even with the through hole 26 having a small diameter, it is possible to improve the strength reliability of the turbine wheel 20.

Figure 8:
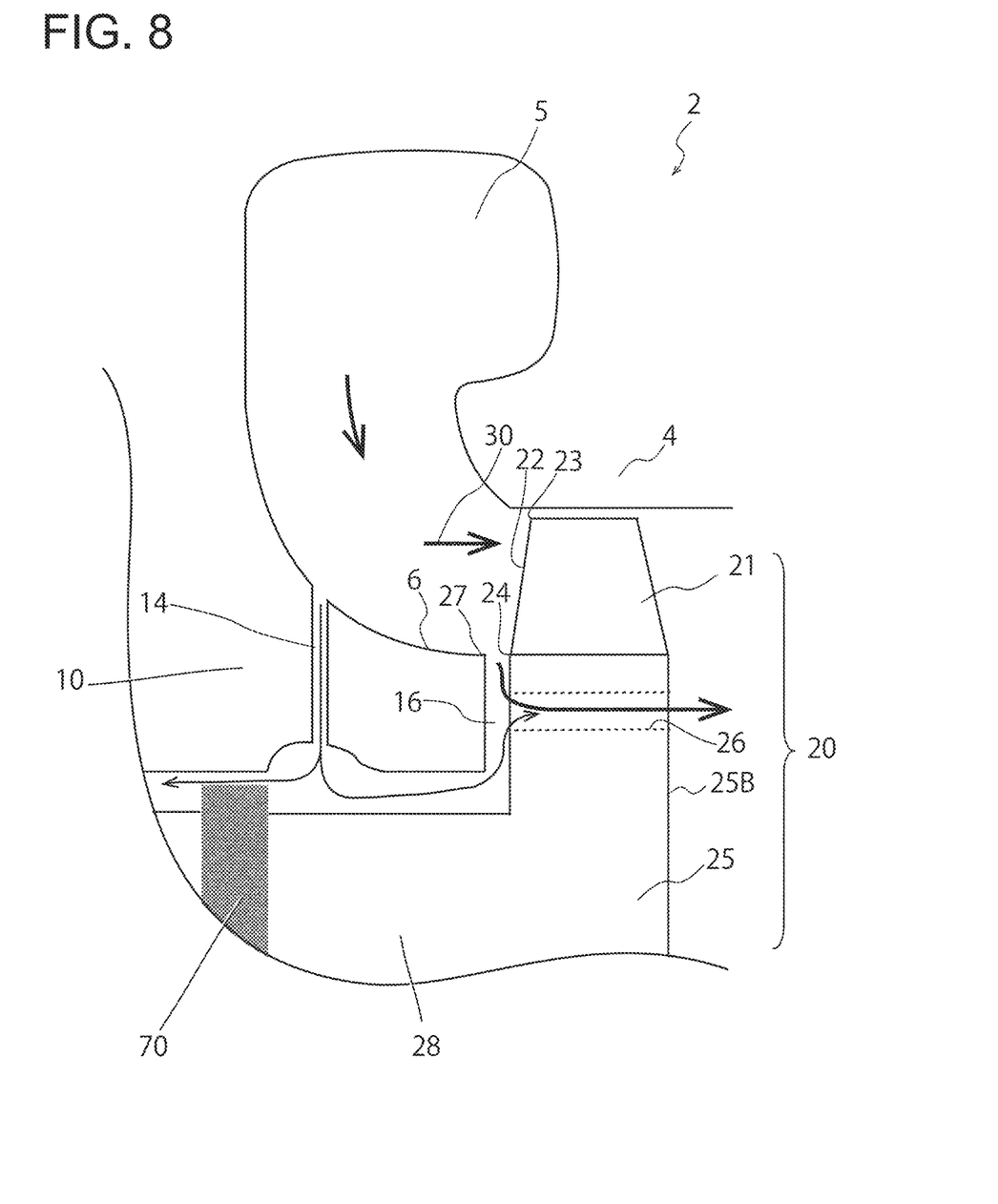
FIG. 8 is a schematic diagram of a housing inner channel according to an embodiment.

FIG. 8 is a schematic diagram of a housing inner channel 14 according to an embodiment. As shown in FIG. 8, in some embodiments, the housing 10 may include at least one housing inner channel 14 opening to the hub-side wall surface 27 of the housing 10 forming the bend part 6. The housing inner channel 14 may communicate with at least one through hole 26. With this configuration, since the housing inner channel 14 communicating with the through hole 26 is provided so as to open to the hub-side wall surface 27 of the housing 10, it is possible to suck out and guide the boundary layer 32 at the beginning of development in the bend part 6 to the through hole 26. Thereby, the turbine efficiency is improved.

In the exemplary embodiment shown in FIG. 8, the housing inner channel 14 extends along the radial direction inside the housing 10 and has a first end opening to the hub-side wall surface 27 inside the housing 10 and a second end opening to a cavity 60 formed between the housing 10 and the turbine shaft 28. The cavity 60 communicates with the clearance 16 between the upstream end surface 25A of the disc part 25 and the housing end surface 11 facing the upstream end surface 25A. Thus, the fluid sucked into the cavity 60 via the housing inner channel 14 is introduced to the through hole 26 via the clearance 16.

Further, the turbine shaft 28 is provided with a shaft seal part 70 to prevent the leakage of the fluid from the cavity 60 between the housing 10 and the turbine shaft 28. A part of the working fluid taken into the cavity 60 via the housing inner channel 14 flows toward the shaft seal part 70 (see FIG. 8).

Figure 9:
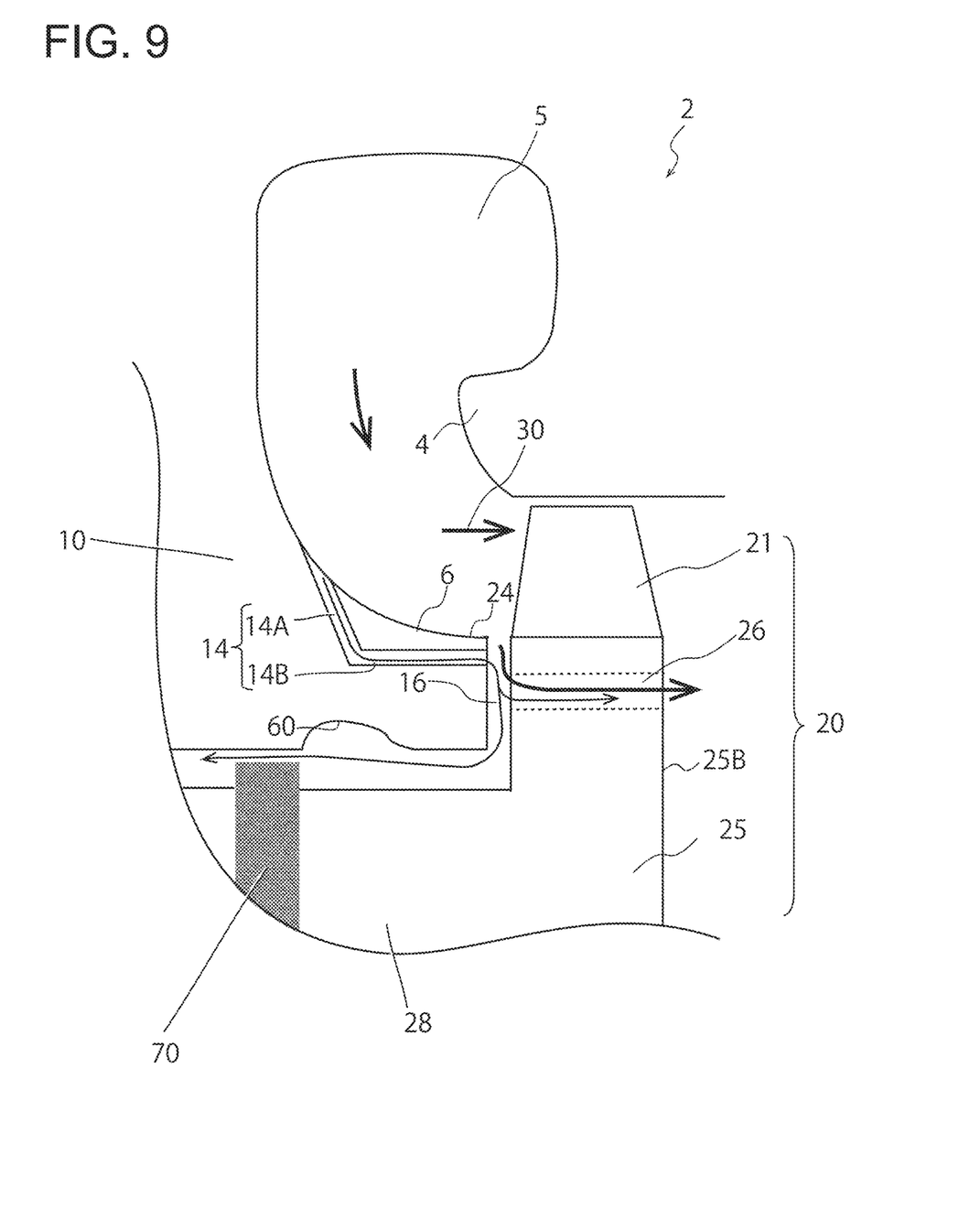
FIG. 9 is a schematic diagram of an exemplary configuration of a housing inner channel according to another embodiment.

FIG. 9 is a schematic diagram of an exemplary configuration of the housing inner channel according to another embodiment.

In another embodiment, as shown in FIG. 9, the housing inner channel 14 includes a first portion 14A extending along the radial direction inside the housing 10 and a second portion 14B extending along the axial direction and connecting the first portion 14A and the clearance 16. In this case, the boundary layer 32 passes through the first portion 14A and the second portion 14B of the housing inner channel 14 and is introduced to the through hole 26 via the clearance 16.

In some embodiments described above, at least one through hole 26 bypassing the blade 21 is provided in the turbine wheel 20, and the boundary layer 32 developing in the vicinity of the hub-side wall surface 27 on the upstream side of the blade 21 is sucked to the downstream side of the blade 21 via the through hole 26 to reduce the thickness of the boundary layer 32. Thereby, it is possible to suppress the reduction in turbine performance due to inflow of the boundary layer 32 to the blade 21 and achieve the turbocharger 1 with improved turbine efficiency.

In a case where the radial inflow turbine 2 is used with high degree of reaction, the pressure in the axial direction (thrust) toward the turbine is considered to increase. In this regard, as shown in the above-described embodiments, by providing the through hole 26 in the disc part 25 of the turbine wheel 20, it is possible to reduce the degree of reaction, and thus reduce the thrust force.

Figure 10:
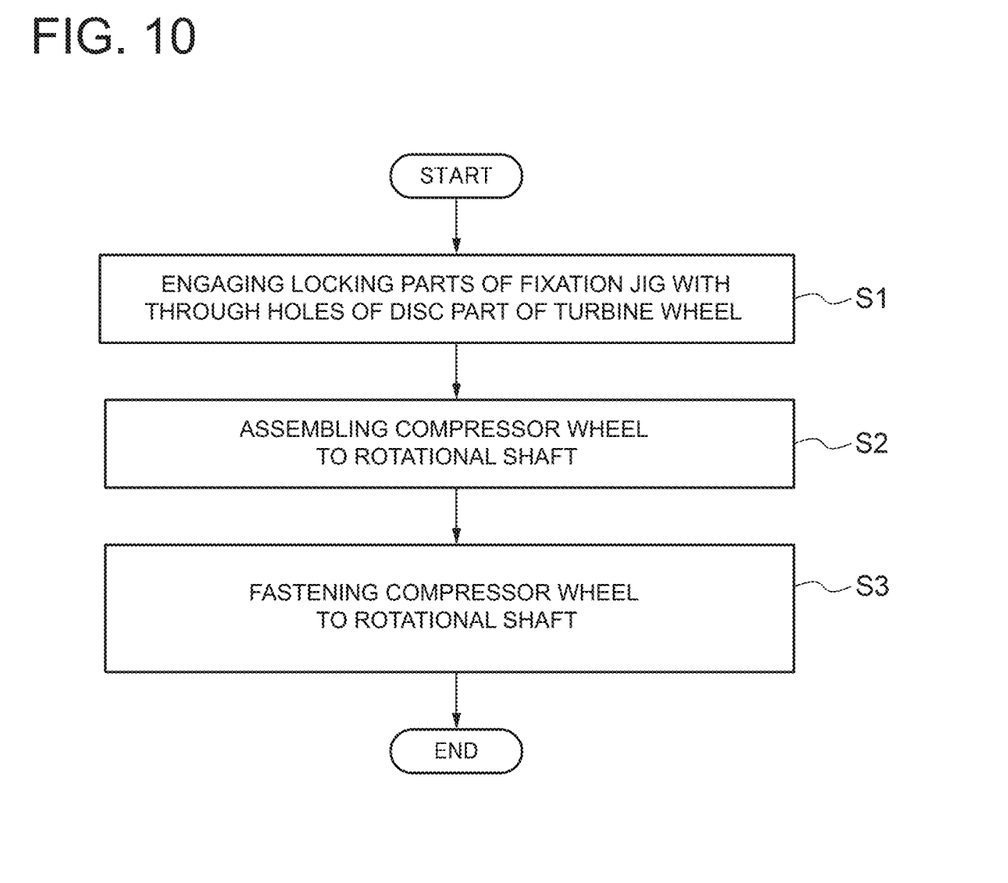
FIG. 10 is a flowchart of a method for assembling a turbocharger according to an embodiment.
Figure 11:
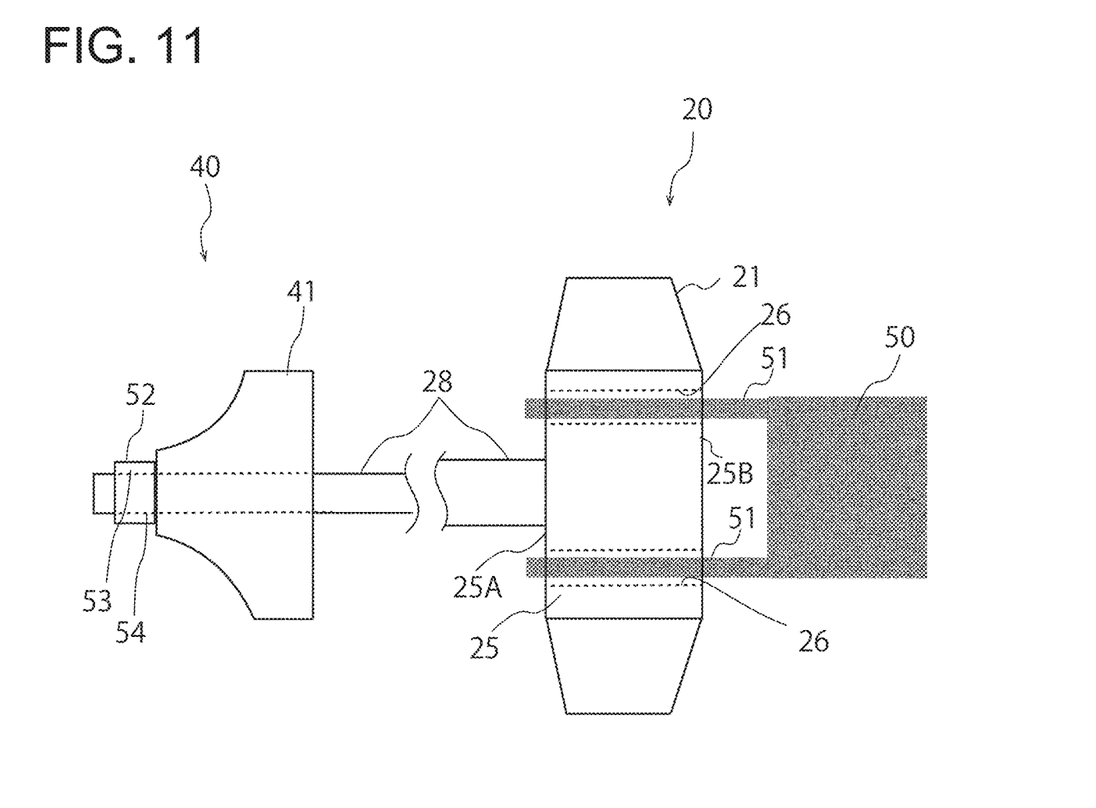
FIG. 11 is a schematic diagram showing a method for assembling a turbocharger according to an embodiment.

Next, with reference to FIGS. 10 and 11, a method for assembling a turbocharger 1 according to at least one embodiment of the present invention will be described. FIG. 10 is a flowchart of the method for assembling a turbocharger according to an embodiment. FIG. 11 is a schematic diagram showing the method for assembling a turbocharger 1 according to an embodiment.

The method for assembling a turbocharger 1 according to at least one embodiment is applied for a turbocharger 1 including a turbine wheel 20 having a blade 21, in which a hub-side end 24 of a leading edge 22 is located radially inward relative to a shroud-side end 23 of the leading edge 22, and a compressor wheel 41 connected to a turbine shaft 28 (rotational shaft of the turbine wheel 20).

As shown in FIG. 10, the method includes a step of respectively engaging a plurality of locking parts 51 of a fixation jig 50 with a plurality of through holes 26 provided in a disc part 25 of the turbine wheel 20 (step S1), a step of assembling a compressor wheel 41 to the turbine shaft 28 which is a rotational shaft (step S2), and a step of screwing a first screw part 53 of a fastening member 52 with a second screw part 54 formed at an end portion of the turbine shaft 28, in a state where the plurality of locking parts 51 of the fixation jig 50 are respectively engaged with the plurality of through holes 26 of the disc part 25, to fasten the compressor wheel 41, which is assembled to the turbine shaft 28, to the turbine shaft 28 (step S3).

With this method, the locking parts 51 of the fixation jig 50 are inserted into the through holes 26 provided in the turbine wheel 20, whereby the shaft of the turbine wheel 20 is easily screwed with the compressor wheel 41. Thus, it is possible to improve the assemblability of the turbocharger 1. In particular, in case of a compact turbocharger 1 having a small turbine wheel 20, its assembling workability affects durability and reliability. The above-described assembling method is advantageous for assembling such a compact turbocharger 1.

Embodiments of the present invention were described in detail above, but the present invention is not limited thereto, and various amendments and modifications may be implemented.

REFERENCE SIGNS LIST

1 Turbocharger
2 Radial inflow turbine (Turbine)
4 Shroud

5 Scroll part
6 Bend part
7 Waste-gate channel
8 Waste-gate valve
10 Housing
11 Housing end surface
14 Housing inner channel
16 Clearance
20 Turbine wheel
21 Blade
22 Leading edge
23 Shroud-side end
24 Hub-side end
25 Disc part
25A Upstream end surface
25B Downstream end surface
25C Annular fin (Fin part)
26 Through hole
27 Flub-side wall surface
28 Turbine shaft (Rotational shaft)
30 Main flow passage
32 Boundary layer
40 Compressor
41 Compressor wheel
50 Fixation jig
51 Locking part
52 Fastening member
53 First screw part
54 Second screw part
60 Cavity
70 Shaft seal part
100 Engine (Inner combustion engine)
101 Piston

The invention claimed is:

1. A radial inflow turbine comprising:
a turbine wheel having a disc part of substantially cylindrical shape and a blade radially formed around the outer periphery of the disc part, wherein a hub-side end of a leading edge of the blade is located radially inward relative to a shroud-side end of the leading edge; and
a housing having a scroll part and a bend part deflecting a flow directed from the scroll part toward the blade of the turbine wheel,
wherein the bend part is configured to deflect a flow of a working fluid flowing radially inward from the scroll part, along an axial direction, and
wherein the turbine wheel has at least one through hole bypassing the blade,
wherein the at least one through hole communicates with a main flow passage of the working fluid in the bend part via a clearance between an upstream end surface of a disc part of the turbine wheel and an end surface of the housing facing the upstream end surface of the disc part,
wherein the at least one through hole has:
a first end which is disposed on an upstream side of the flow and at which the at least one through hole opens to the clearance; and
a second end opposite to the first end and disposed on a downstream side of the flow, and
wherein the at least one through hole is disposed in the disc part, and is entirely located radially inward relative to the blade.

2. The radial inflow turbine according to claim 1,
wherein the working fluid from the scroll part directly flows into the blade without passing through a stationary vane.

3. The radial inflow turbine according to claim 1, further comprising:
a fin part protruding in the axial direction from the upstream end surface of the disc part toward the end surface of the housing.

4. The radial inflow turbine according to claim 3,
wherein the fin part is an annular fin having an outer peripheral surface extending along an extension line of a hub-side inner wall surface of the housing forming the bend part in an axial cross-section.

5. The radial inflow turbine according to claim 1, further comprising:
a waste-gate channel through which the working fluid flows from an inlet side to an outlet side of the radial inflow turbine so as to bypass the blade, and
a waste-gate valve disposed in the waste-gate channel.

6. The radial inflow turbine according to claim 1,
wherein the housing includes at least one housing inner channel opening to a hub-side inner wall surface of the housing forming the bend part, and
wherein the at least one housing inner channel communicates with the at least one through hole.

7. A turbocharger comprising
the radial inflow turbine according to claim 1; and
a compressor for driving the radial inflow turbine.

8. A radial inflow turbine comprising:
a turbine wheel having a blade, wherein a hub-side end of a leading edge of the blade is located radially inward relative to a shroud-side end of the leading edge; and
a housing having a scroll part and a bend part deflecting a flow directed from the scroll part toward the blade of the turbine wheel,
wherein the bend part is configured to deflect a flow of a working fluid flowing radially inward from the scroll part, along an axial direction,
wherein the turbine wheel has at least one through hole bypassing the blade, and
wherein a ratio of a suction flow rate of the working fluid sucked via the at least one through hole to a flow rate of the working fluid flowing into the bend part is 0.01 or more and 0.04 or less.

9. A radial inflow turbine comprising:
a turbine wheel having a blade, wherein a hub-side end of a leading edge of the blade is located radially inward relative to a shroud-side end of the leading edge; and
a housing having a scroll part and a bend part deflecting a flow directed from the scroll part toward the blade of the turbine wheel,
wherein the bend part is configured to deflect a flow of a working fluid flowing radially inward from the scroll part, along an axial direction,
wherein the turbine wheel has at least one through hole bypassing the blade, and
wherein the at least one through hole extends obliquely with respect to the axial direction so as to deviate radially outward from an upstream side to a downstream side.

10. A method for assembling a turbocharger including a turbine wheel having a blade and a compressor wheel connected to a rotational shaft of the turbine wheel, a hub-side end of a leading edge of the blade being located radially inward relative to a shroud-side end of the leading edge, the method comprising:
a step of respectively engaging a plurality of locking parts of a fixation jig with a plurality of through holes provided in a disc part of the turbine wheel;

a step of assembling the compressor wheel to the rotational shaft; and a step of screwing a first screw part of a fastening member with a second screw part formed at an end portion of the rotational shaft, in a state where the plurality of locking parts of the fixation jig are respectively engaged with the plurality of through holes of the disc part, to fasten the compressor wheel, which is assembled to the rotational shaft, to the rotational shaft.

* * * * *